US 12,505,339 B1

(12) United States Patent
Diamant et al.

(10) Patent No.: US 12,505,339 B1
(45) Date of Patent: Dec. 23, 2025

(54) ACCELERATED MEMORY COPY OPERATIONS

(71) Applicant: Amazon Technologies, Inc., Seattle, WA (US)

(72) Inventors: Ron Diamant, San Jose, CA (US); Xin Tong, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1053 days.

(21) Appl. No.: 17/468,002

(22) Filed: Sep. 7, 2021

(51) Int. Cl.
*G06F 3/06* (2006.01)
*G06F 13/16* (2006.01)
*G06N 3/04* (2023.01)
*G06N 3/065* (2023.01)

(52) U.S. Cl.
CPC ........... *G06N 3/065* (2023.01); *G06F 3/0604* (2013.01); *G06F 3/0638* (2013.01); *G06F 3/065* (2013.01); *G06F 3/0683* (2013.01); *G06F 13/1673* (2013.01); *G06N 3/04* (2013.01)

(58) Field of Classification Search
None
See application file for complete search history.

(56) References Cited

U.S. PATENT DOCUMENTS

2021/0326489 A1* 10/2021 Kee ..................... G06F 12/0638

* cited by examiner

*Primary Examiner* — Scott C Sun
(74) *Attorney, Agent, or Firm* — Weaver Austin Villeneuve & Sampson LLP

(57) ABSTRACT

An opportunistic approach is described to accelerate certain memory copy operations to be performed by a computing engine by executing instructions. An instruction for a memory copy operation can be identified that has a first data type with a smaller number of bits per data element than supported by the computing engine to perform the copy operation. The instruction can be replaced with another instruction that has a second data type with a higher number of bits per data element based on the alignment of the memory addresses for the copy operation and the total number of data elements to be copied. The second data type may not only accelerate the copy operation but also provide better utilization of the underlying hardware of the computing engine.

20 Claims, 8 Drawing Sheets

ACCELERATED MEMORY COPY OPERATIONS

BACKGROUND

Artificial neural networks are computing systems with an architecture based on biological neural networks. Artificial neural networks can be trained using training data to learn how to perform certain tasks, such as identifying or classifying physical objects, activities, characters, or the like, from images or videos. A neural network may be represented using a neural network compute graph comprising different types of operations to be performed on an input data set. The operations may include, for example, load, store, pooling, activation, or matrix multiplication. A compiler can be used to generate machine level instructions based on the neural network compute graph. The machine level instructions can be executed by a neural network processor to generate output data based on the input data set. The input data set, output data, and intermediate results may be stored in different memories and can be accessed by different components of the neural network processor. Thus, copy operations may be performed frequently by the neural network processor to move data between memories.

BRIEF DESCRIPTION OF THE DRAWINGS

Various embodiments in accordance with the present disclosure will be described with reference to the drawings, in which.

DETAILED DESCRIPTION

Figure 1:
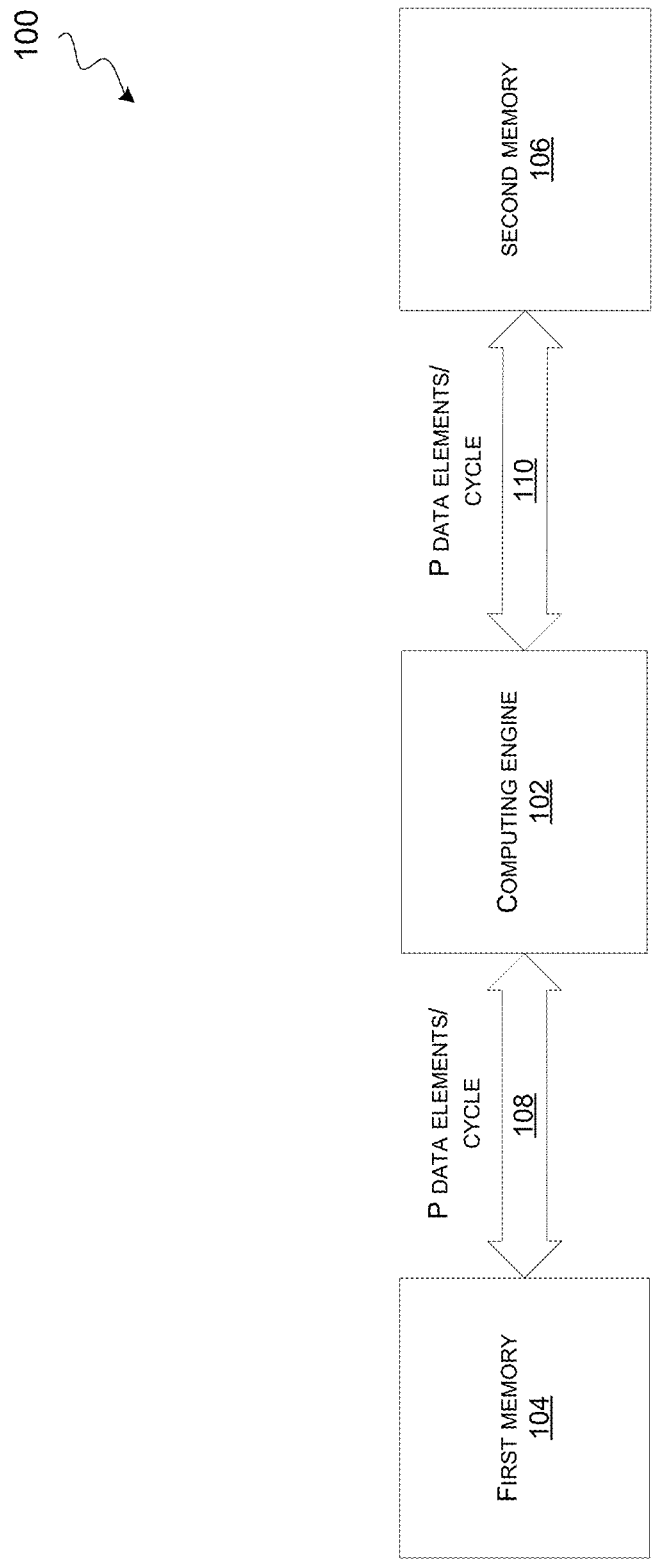
FIG. 1 illustrates an integrated circuit that can be used to describe certain embodiments.

Artificial neural networks can be utilized to provide services including image recognition, audio processing, video processing, or text-based queries, among other examples. An artificial neural network (ANN) is generally a set of algorithms modeled loosely after the human brain, which can be used to recognize underlying relationships or patterns in an input dataset through a process that mimics the way a human brain operates. The input dataset may correspond to an image, a text, an audio, or a video that needs to be operated on.

A neural network model of an ANN can be represented using a high-level programming language, such as Java, C++, R, Go, Python, or Tensorflow®. The neural network model can be processed by a compiler to generate machine level instructions that can be executed by a neural network processor to generate output data based on the input dataset. The compiler can process the neural network model over multiple stages that may include generating intermediate representation (IR) instructions based on the neural network model, memory allocation, and optimization for the given hardware architecture before generating the machine level instructions. In some implementations, a front-end portion of the compiler may process a neural network compute graph for a neural network, and provide a textual representation of the compute graph to a middle-end portion of the compiler. The middle-end may generate the IR instructions that can be optimized for the hardware architecture of the given neural network processor and mapped to the machine level instructions by a back-end portion of the compiler for execution by different components of the neural network processor.

The IR instructions may include various instructions including instructions for neural network computations and memory copy operations (e.g., tensor copy operations). The data for the memory copy operations may correspond to the input dataset, the output data, or intermediate results generated from the neural network computations. For example, the memory copy operations may be performed to move data for the input dataset stored in a memory into a computing engine, or to store results of the neural network computations into another memory. An IR instruction for a memory copy operation may include a source memory address, a destination memory address, a data type identifier indicating a data type that has M number of bytes per data element, and a total number of data elements in the data type to be copied. The data type can be one of a signed integer (INT) data type, an unsigned integer (UINT) data type, a floating point (FP) data type, or a brain floating point (BFloat) data type. For example, the INT data type may include an INT8, INT16, INT32, or an INT64 data type. The UINT data type may include an UINT8, UINT16, UINT32, or an UINT64 data type. The FP data type may include a FP8, FP16, FP32, or a FP64 data type. The BFloat data type may include a BFloat16 data type. As an example, an FP16 data type may indicate that each data element being copied is a 16-bit (2-byte) FP number, and an FP32 data type may indicate that each data element being copied is a 32-bit (4-byte) FP number.

In some implementations, the IR instruction for the memory copy operation may be executed by a computing engine. Generally, the underlying hardware of the computing engine may support a certain number of bits per cycle for copying each data element based on the hardware architecture. As an example, the data path in the computing engine may support copying 128 data elements in parallel per cycle from a source memory to a destination memory with a maximum size of each data element being 4 bytes. A first bus between the source memory and the computing engine, and a second bus between the computing engine and the destination memory may also support 128×4 bytes of simultaneous data transfers to allow copying 128 data elements in parallel by the computing engine. Thus, in this example, with a FP32 data type occupying all 4 bytes of the maximum allowable data element size, the underlying hardware can be fully utilized because 128 FP32 data elements can be copied each cycle. However, some copy operations may include a data type having a number of bits that is smaller than a maximum number of bits per cycle supported by the underlying hardware to copy each data element. For example, some copy operations may include compact data types such as FP8 or FP16. In such cases, the computing engine may copy 128 FP8 or FP16 data elements each cycle. However, the first bus, second bus, and the data path may be underutilized since each data element includes a smaller number of bits per data element than the maximum number of bits supported by the hardware.

In various embodiments, a compiler may employ an opportunistic approach to identify certain memory copy instructions that can be accelerated by efficiently utilizing the underlying hardware for the memory copy operations without any changes in the hardware. In some embodiments, a first copy instruction having a first data type with a smaller number of bits per data element can be replaced with a second copy instruction having a second data type with a higher number of bits per data element supported by the hardware to fully utilize the capacity of the data path for the copy operation. The second data type can be determined based on the alignment of the source and destination memory addresses, and a first total number of data elements to be copied. The number of bits per data element in the second data type can be an integer multiple of the number of bits per data element in the first data type. The second memory copy instruction may include a second total number of data elements to be copied, which may be determined based on the ratio of the number of bits per data element in the first data type to the number of bits per data element in the second data type, and the first total number of data elements. In some embodiments, the first data type and the second data type can be of different data types, e.g., FP, INT, UINT, or BFloat. For example, a smaller FP data type (e.g., FP8) can be replaced with a higher BFloat data type (e.g., BFloat16), or a smaller INT data type (e.g., INT8 or INT16) can be replaced with a higher FP data type (e.g., FP32 or FP64).

For example, a first memory copy instruction with data elements of the FP16 data type can be replaced with a second memory copy instruction with a data type of FP32 if the source and destination memory addresses are aligned on a 4-byte boundary, and the first total number of data elements to be copied is an even number. In one specific example, if the first total number of FP16 data elements in the first memory copy instruction is 8, then the second memory copy instruction may indicate the second total number of data elements of FP32 data type to be 4. In another example, a first memory copy instruction with an FP8 data type can be replaced with a second memory copy instruction with an FP32 data type if the source and destination memory addresses are aligned on a 4-byte boundary, and the first total number of data elements to be copied is an even number. In this example, if the first total number of FP8 data elements in the first memory copy instruction is 8, the second memory copy instruction may indicate the second total number of data elements of FP32 data type to be 2. By replacing the first memory copy instruction with the second memory instruction including a higher bit-width data type, the memory bus width can be fully utilized. Thus, the copy operation performed using the second memory copy instruction may take fewer cycles as compared to the first memory copy instruction.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates an integrated circuit 100 that can be used to describe certain embodiments. The integrated circuit 100 can be part of a computing system that may include other components based on the functionalities supported by the computing system. For example, the computing system may be used for neural network computations, cryptographic computations, audio processing, or video processing, among others. The integrated circuit 100 may include a computing engine 102 coupled to a first memory 104 via a first bus 108, and to a second memory 106 via a second bus 110.

The computing engine 102 may be configured to perform certain arithmetic computations based on the functionalities supported by the computing system. In some examples, the computing engine 102 may include P number of execution engines to perform P number of computations in parallel on P number of data elements. P can be a positive integer. The computing engine 102 may be configured to execute instructions to perform the intended functionality. For example, the computing system may include other components (not shown) to enable execution of the instructions by the computing engine 102. The instructions may include reading or writing the first memory 104 or the second memory 106, performing arithmetic computations on the P number of data elements, or copying the P number of data elements from the first memory 104 to the second memory 106 or vice-versa.

Each data element of the P number of data elements may be represented using a data type that can have M number of bytes per data element. M can have a value of 1, 2, 4, 8, or more. The data type can be one of a signed integer (INT) data type, an unsigned integer (UINT) data type, a floating point (FP) data type, or a brain floating point (BFloat) data type. For example, the INT data type may include an INT8, INT16, INT32, or an INT64 data type, the UINT data type may include an UINT8, UINT16, UINT32, or an UINT64 data type, the FP data type may include an FP8, FP16, FP32, or an FP64 data type, and the BFloat data type may include a BFloat16 data type based on the hardware architecture. As an example, the FP8 data type may represent 8-bits (M=1) of FP data in each data element, the BFloat16 data type may represent 16-bits (M=2) of BFloat data in each data element, and the UINT32 data type may represent 32-bits (M=4) of unsigned integer data in each data element.

The first memory 104 and/or the second memory 106 can be a type of random access memory (RAM) such as an SRAM, a DRAM, an SDRAM, or a DDR SDRAM. In some implementations, the first memory 104 and/or the second memory 106 can be implemented using high-bandwidth memory (HBM). However, any suitable memory type can be used. Each of the first memory 104 and the second memory 106 may be configured to support reading or writing the P number of data elements in parallel via the first bus 108 and the second bus 110, respectively. An example memory configuration for the first memory 104 and the second memory 106 is described with reference to FIG. 2.

Figure 2:
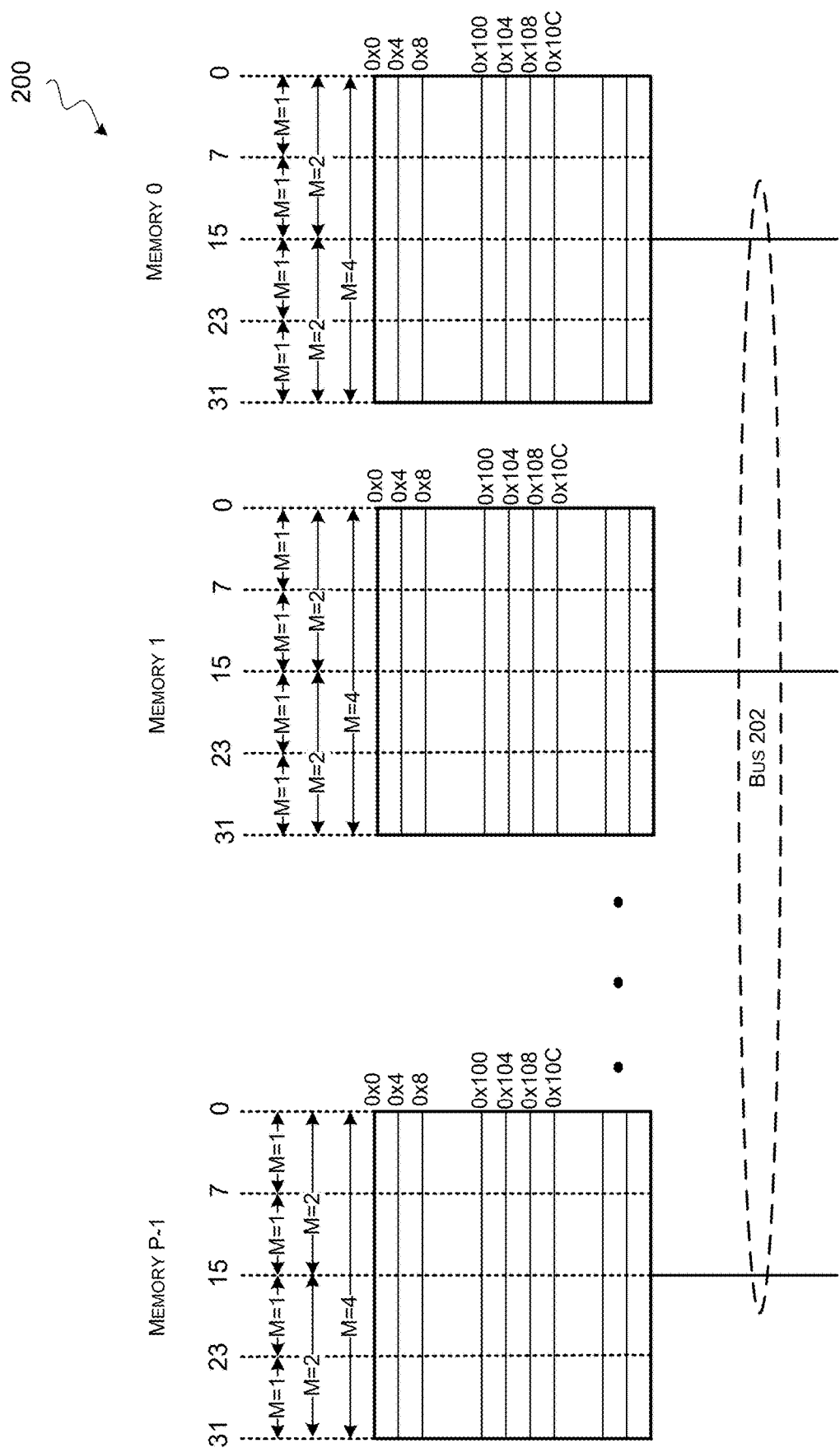
FIG. 2 illustrates a memory configuration that can be used as an example configuration for a first memory or a second memory.

FIG. 2 illustrates a memory configuration 200 that can be used as an example configuration for the first memory 104 or the second memory 106.

The memory configuration 200 may include P number of memory units including a memory 0, a memory 1, and a memory P−1. The P number of memory units may be implemented as individual memory partitions, memory banks, or other physical or logical separation of a memory. Each memory unit can be of size D×W, where D is the depth of the memory unit, and W is the width in bytes. FIG. 2 shows each memory unit to be 32-bits wide (W=4); however, other suitable widths are possible. Each memory unit may be 1-byte, 2-byte, or 4-byte addressable. For example, a byte of each memory unit can be accessed using an address that is aligned on a 1-byte address boundary (e.g., 0x0, 0x1, 0x2, 0x3, 0x4). A set of 2-bytes of each memory unit can be accessed using an address that is aligned on a 2-byte address boundary (e.g., 0x0, 0x2, 0x4). A set of 4-bytes of each memory unit can be accessed using an address that is aligned on a 4-byte address boundary (e.g., 0x0, 0x4, 0x8).

In some implementations, a data element of an 8-bit data type (M=1), a 16-bit data type (M=2), or a 32-bit data type (M=4) can be read from or written to each of the P number of memory units simultaneously. For example, a data element 0 can be read from or written to the memory 0, a data element 1 can be read from or written to the memory 1, and a data element P−1 can be read from or written to the memory P−1. The P number of data elements can be accessed in parallel using a bus 202. In some embodiments, the P number of data elements can be accessed in parallel from the corresponding P number of memory units via the bus 202 using a same memory address. For example, each of the P number of memory units may have different base addresses; however, appropriate stride or offset values can be used to allow accessing the P number of data elements simultaneously from the corresponding P number of memory units using the same memory address. The bus 202 can be an example of the first bus 108 and the second bus 110 in FIG. 1. As an example, the bus 202 may include 128×32 wires with P being equal to 128.

Referring back to FIG. 1, the first bus 108 can allow transferring at least P number of data elements per cycle simultaneously between the first memory 104 and the computing engine 102, and the second bus 110 can allow transferring at least P number of data elements per cycle simultaneously between the second memory 106 and the computing engine 102. In some implementations, the data path in the computing engine 102 may allow performing parallel computations on the P×Q bytes of data elements. Herein, Q may represent a maximum number of bytes (or bits) per data element supported by the computing engine 102 in each cycle. As an example, the computing engine 102 may support accessing maximum 4-bytes of data (Q=M=4) simultaneously from each of the P number of memory units in FIG. 2. In some implementations, the first bus 108 and the second bus 110 can have different bus widths.

In some examples, the computing engine 102 may execute a copy instruction to copy data from the first memory 104 to the second memory 106. The copy instruction may include a source address associated with the first memory 104, a destination address associated with the second memory 106, a data type identifier indicating a data type that has M number of bytes per data element, and a total number of data elements in the data type to be copied for each of the P number of memory units. The computing engine 102 may be configured to perform the copy instruction by copying P number of data elements per cycle from the respective P number of memory units in the first memory to the second memory with each data element in the data type represented by the data type identifier. The same source address and the same destination address can be used to access each of the P number of data elements in parallel from the respective P number of memory units using appropriate values for the strides or offsets for the P number of memory units.

Different data type identifiers may indicate different number of bytes per data element to copy. As an example, a first data type identifier may indicate an FP8 data type that has 1-byte per data element to be copied from each of the P number of memory units in the first memory 104 to the second memory 106, a second data type identifier may indicate a BFloat16 data type that has 2-bytes per data element to be copied from each of the P number of memory units in the first memory 104 to the second memory 106, and a third data type identifier may indicate an UINT32 data type that has 4-bytes per data element to be copied from each of the P number of memory units in the first memory 104 to the second memory 106.

The source address and the destination address for the copy instruction may be aligned to a 1-byte address boundary for an 8-bit data type, to a 2-byte address boundary for a 16-bit data type, and to a 4-byte address boundary for a 32-bit data type. As an example, a copy instruction may include the source address as 0x100, a data type identifier indicating an FP32 data type, and the total number of data elements as 2 in the FP32 data type. Referring back to FIG. 2, a first 32-bit data element can be read from each of the P number of memory units simultaneously from the address 0x100 in the first cycle, and a second 32-bit data element can be read from each of the P number of memory units simultaneously from the address 0x104 in the second cycle. Thus, the computing engine 102 may consume 2 cycle to perform the copy operation on 2×P number of 32-bit data elements by reading the 2×P number of 32-bit data elements from the first memory 104 via the first bus 108 and copying to the second memory 106 via the second bus 110. Therefore, for the 32-bit data type, the first bus 108 and the second bus 110 may be fully utilized.

In some cases, a copy instruction may include a compact data type (e.g., FP16 or FP8) to copy smaller number of bits per cycle for each data element. For example, a copy instruction may include the source address as 0x100, a data type identifier indicating an FP16 data type, and the total number of data elements as 2 in the FP16 data type. Referring back to FIG. 2, a first 16-bit data element can be read from each of the P number of memory units simultaneously from the address 0x100 in the first cycle, and a second 16-bit data element can be read from each of the P number of memory units simultaneously from the address 0x102 in the second cycle. The computing engine 102 may perform the copy operation on the 2×P 16-bit data elements by reading the 2×P 16-bit data elements from the first memory 104 via the first bus 108 and copying to the second memory 106 via the second bus 110 over two cycles. Thus, for the 16-bit data type, the computing engine 102 may also consume 2 cycles; however, the first bus 108 and the second bus 110 may not be fully utilized in each cycle since only half of the maximum number of bytes per data element supported by the computing engine 102 are being used. Similarly, for a copy operation with an FP8 data type, only quarter of the first bus 108 and the second bus 110 may be utilized per cycle. This is further discussed with reference to FIG. 3.

Figure 3:
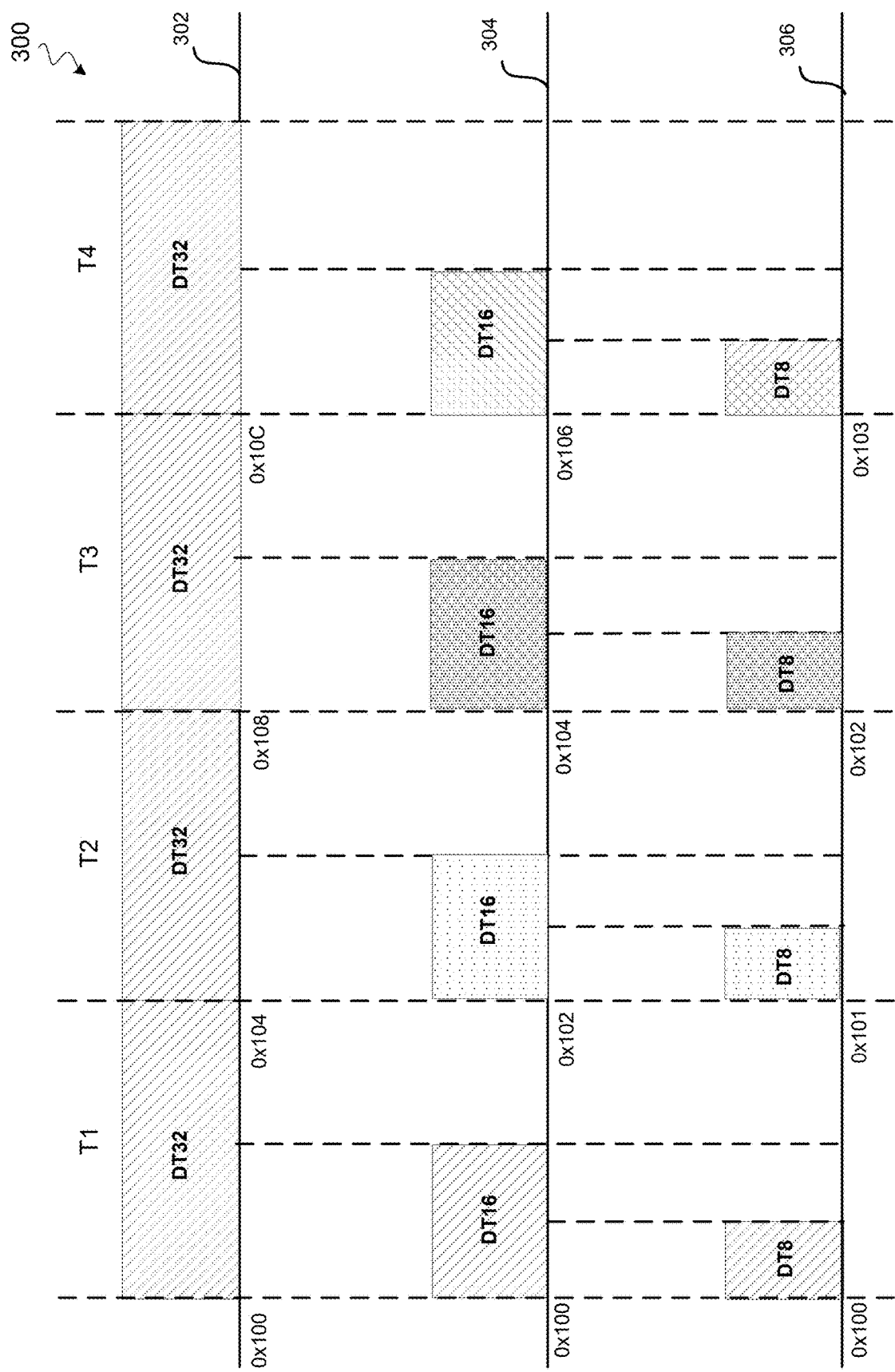
FIG. 3 illustrates different data types for a copy operation.

FIG. 3 illustrates different data types 300 for a copy operation. An instruction for the copy operation may include a source address as 0x100 and a total number of data elements to be copied as 4. The instruction for the copy operation may also include a first data type identifier indicating a 32-bit data type (denoted by "DT32") as shown in a timing diagram 302, a second data type identifier indicating a 16-bit data type (denoted by "DT16") as shown in a timing diagram 304, or a third data type identifier indicating an 8-bit data type (denoted by "DT8") as shown in a timing diagram 306. DT32 may be an FP32, INT32, or an UINT32 data type. DT16 may be an FP16, INT16, UINT16, or a BFloat16 data type. DT8 may include an FP8, INT8, or an UINT8 data type. Note that the source address and the destination address may be aligned to an address boundary associated with the data type used for the copy operation.

FIG. 3 shows the copy operation to copy 4 data elements of the DT32 over 4 cycles in the timing diagram 302. In a T1 cycle, first P number of data elements of the DT32 may be copied from the source address 0x100 in the first memory 104 to the given destination address (e.g., 0x140) in the second memory 106. In a T2 cycle, second P number of data elements of the DT32 may be copied from the source address 0x104 in the first memory 104 to the given destination address (e.g., 0x144) in the second memory 106. In a T3 cycle, third P number of data elements of the DT32 may be copied from the source address 0x108 in the first memory 104 to the given destination address (e.g., 0x148) in the second memory 106. In a T4 cycle, fourth P number of data elements of the DT32 may be copied from the source address 0x10C in the first memory 104 to the given destination address (e.g., 0x14C) in the second memory 106. Thus, the 4 data elements may be copied over 4 cycles, and the first bus 108 and the second 110 may be fully utilized for each cycle of the data transfer since the DT32 used for the copy operation represents the maximum number of bytes per data element (e.g., 4-bytes) supported by the computing engine 102.

FIG. 3 also shows the copy operation to copy 4 data elements of the DT16 over 4 cycles in the timing diagram 304. In the T1 cycle, first P number of data elements of the DT16 may be copied from the source address 0x100 in the first memory 104 to the given destination address (e.g., 0x140) in the second memory 106. In the T2 cycle, second P number of data elements of the DT16 may be copied from the source address 0x102 in the first memory 104 to the given destination address (e.g., 0x142) in the second memory 106. In the T3 cycle, third P number of data elements of the DT16 may be copied from the source address 0x104 in the first memory 104 to the given destination address (e.g., 0x144) in the second memory 106. In the T4 cycle, fourth P number of data elements of the DT16 may be copied from the source address 0x106 in the first memory 104 to the given destination address (e.g., 0x146) in the second memory 106. Thus, even though the 4 data elements are copied over 4 cycles, only half of the first bus 108 and the second 110 can be utilized for each cycle of the data transfer since the DT16 used for the copy operation is smaller than the maximum number of bytes per data element (e.g., 4-bytes) supported by the computing engine 102.

FIG. 3 also shows the copy operation to copy 4 data elements of the DT8 over 4 cycles in the timing diagram 306. In the T1 cycle, first P number of data elements of the DT8 may be copied from the source address 0x100 in the first memory 104 to the given destination address (e.g., 0x140) in the second memory 106. In the T2 cycle, second P number of data elements of the DT8 may be copied from the source address 0x101 in the first memory 104 to the given destination address (e.g., 0x141) in the second memory 106. In the T3 cycle, third P number of data elements of the DT8 may be copied from the source address 0x102 in the first memory 104 to the given destination address (e.g., 0x142) in the second memory 106. In the T4 cycle, fourth P number of data elements of the DT8 may be copied from the source address 0x103 in the first memory 104 to the given destination address (e.g., 0x143) in the second memory 106. Thus, even though the 4 data elements are copied over 4 cycles, only quarter of the first bus 108 and the second 110 can be utilized for each cycle of the data transfer since the DT8 used for the copy operation is smaller than the maximum number of bytes per data element (e.g., 4-bytes) supported by the computing engine 102.

In some implementations, the data path in the computing engine 102 may be designed to perform parallel operations on a fixed number of bits. For example, the computing engine 102 may be designed to support maximum 32-bit parallel copy operations on the P number of data elements. In cases wherein a copy instruction has a data type (e.g., DT8, DT16) that is smaller than the highest bit-width data type (e.g., DT32) supported by the computing engine 102, the computing engine 102 may execute the instruction by performing the copy operation with unused data bits as shown in the timing diagrams 304 and 306. Therefore, for the data types with the smaller number of bits per data element than supported by the computing engine 102, the underlying hardware may not be fully utilized. Thus, it may be desirable to fully utilize the underlying hardware for the data types with the smaller number of bits per data element.

Certain embodiments can provide an opportunistic approach to replace a data type having the smaller number of bits per data element used by a copy instruction with another data type having the higher number of bits per data element supported by the underlying hardware. The first data type and the second data type can be of a same data type or different data types (e.g., any of FP, INT, UINT, or Bfloat). A copy instruction having the smaller data type can be replaced with another copy instruction having the higher data type based on the alignment of the source and destination addresses to an address boundary associated with the higher data type, and the total number of data elements to be copied. The number of bits per data element in the higher data type can be a multiple of the number of bits per data element in the smaller data type. Furthermore, the total number of data elements to be copied with the higher data type may be determined based on the ratio of the smaller number of bits per data element for the smaller data type to the higher number of bits per data element for the higher data type multiplied with the total number of data elements to be copied with the smaller data type. This is further explained with reference to FIG. 4.

Figure 4:
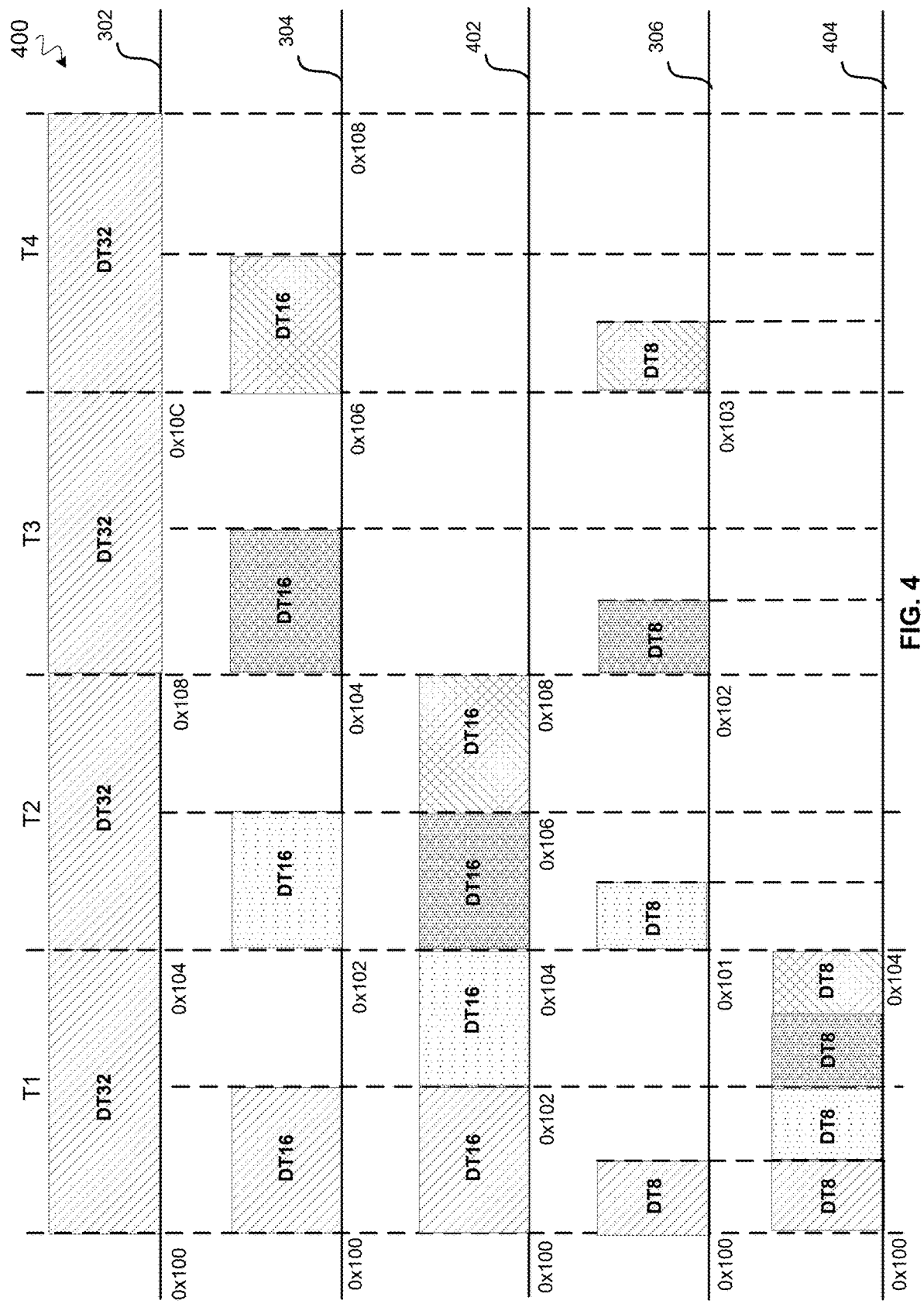
FIG. 4 illustrates data transfers for a copy operation with different data types according to certain embodiments.

FIG. 4 illustrates data transfers for a copy operation with different data types 400 according to certain embodiments.

In some embodiments, a copy instruction with the DT16 can be replaced with another copy instruction with the DT32 if the source address and the destination address are aligned on a 4-byte address boundary and the total number of data elements to be copied is an even number. As shown in the timing diagram 304, since the source address 0x100 is aligned on a 4-byte address boundary and the total number of data elements to be copied is 4, the copy operation starting at the address 0x100 to copy each data element with the DT16 can be paired to fully utilize the buses in each cycle of the copy operation. As FIG. 4 shows in a timing diagram 402, the copy operations in the cycles T1 and T2 with the DT16 can be paired to be performed in the cycle T1 as the DT32, and the copy operations in the cycles T3 and T4 with the DT16 can be paired to be performed in the cycle T2 as the DT32. Note that combining the smaller data types into a higher data type may reduce the total number of data elements of the higher data type to be copied for each of the P number of memory units. For example, the copy instruction with the data type as DT16 and the total number of data elements as 4 can be replaced with another copy instruction with the data type as DT32 and the total number of data elements as 2 (e.g., (16/32)×4=2).

Similarly, the copy operations with the DT8 shown in the timing diagram 306 can be combined as shown in a timing diagram 404. As shown in 306, since the source address 0x100 is aligned on a 4-byte address boundary and the total number of data elements to be copied is 4, the copy operation starting at the address 0x100 to copy each data element with the DT8 in the cycle T1 can be combined with the copy operations in the cycles T2, T3 and T4 to fully utilize the buses for the copy operation. As FIG. 4 shows in the timing diagram 404, the copy operations in the cycles T1, T2, T3, and T4 with data type DT8 can be combined to be performed in the cycle T1 as data type DT32. In this case, the copy instruction with the data type as DT8 and the total number of data elements as 4 can be replaced with another copy instruction with the data type as DT32 and the total number of data elements as 1 (e.g., (8/32)×4=1).

In another example, if the source address for the copy operation with data type DT8 is aligned on a 2-byte boundary (e.g., 0x102) instead of a 4-byte boundary, the copy operations with the data type DT8 can be replaced with the data type DT16 and the total number of data elements can be changed to 2, since the copy operation may be performed over 2 cycles with the data type DT16 as compared to 1 cycle with the data type DT32. Thus, combining the data elements with the smaller data types and replacing with the higher data types can allow better utilization of the underlying hardware in addition to accelerating the memory copy operations.

In some embodiments, the copy instruction having the smaller data type can be replaced with another copy instruction having the higher data type by a compiler. For example, the compiler can be used to generate machine level instructions based on a neural network model that can be executed by a neural network processor to perform computations for training a neural network or making predictions. The compiler may process a neural network computation graph for a neural network to generate intermediate representation (IR) instructions that can be optimized for the specific hardware architecture and used to generate the machine level instructions. The embodiments can provide an opportunistic approach for the compiler to identify the IR instructions for copy operations that can be optimized based on certain criteria. This is further explained with reference to FIGS. 5 and 6.

Figure 5:
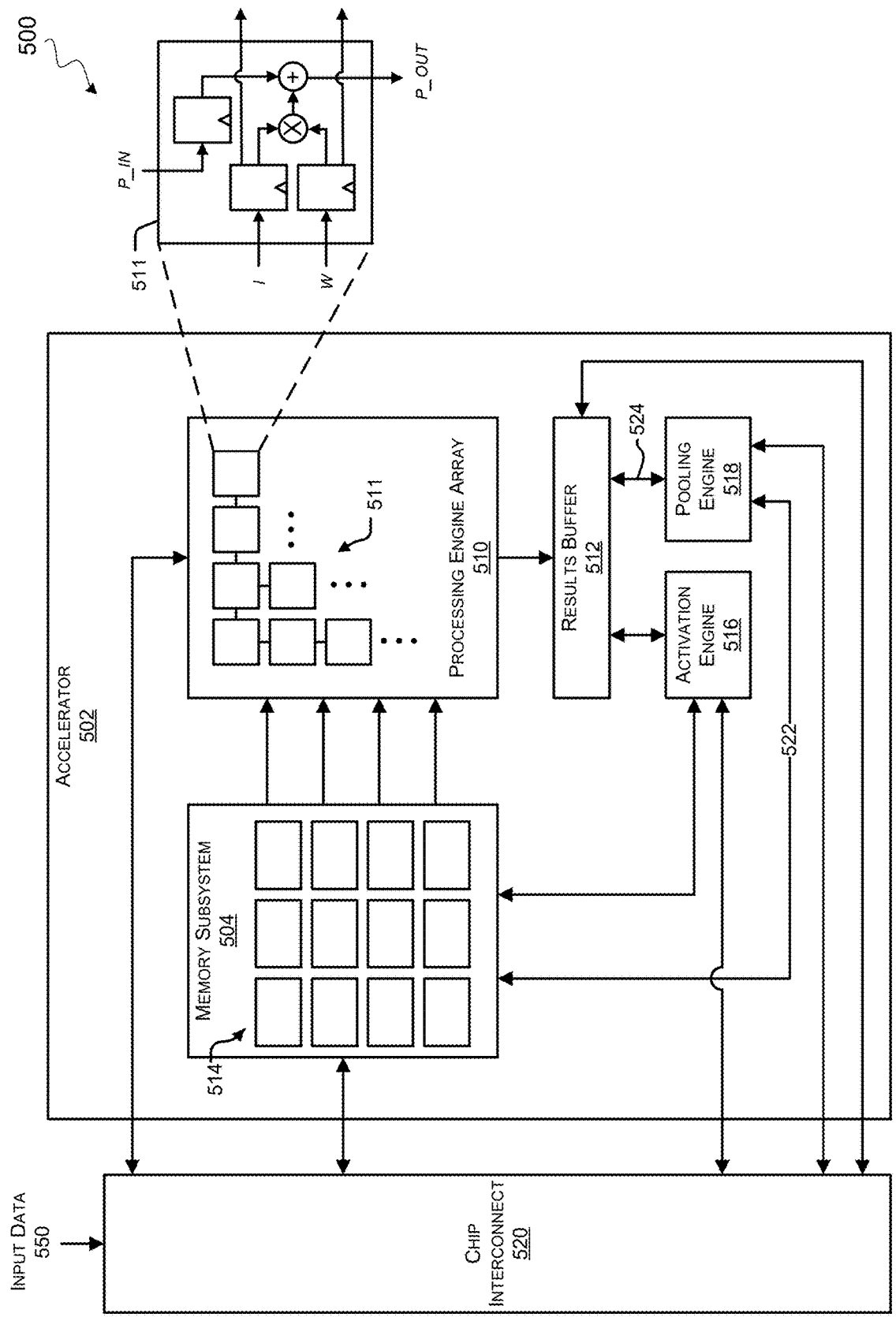
FIG. 5 is a block diagram illustrating an example of an integrated circuit device, which can utilize an opportunistic approach to accelerate memory copy operations according to certain embodiments.

FIG. 5 is a block diagram illustrating an example of an integrated circuit device, which can utilize the opportunistic approach to accelerate memory copy operations according to certain embodiments. The example of FIG. 5 illustrates an accelerator 502. In various examples, the accelerator 502, for a set of input data (e.g., input data 550), can execute computations using a processing engine array 510, an activation engine 516, and a pooling engine 518. In some examples, the example accelerator 502 may be an integrated circuit component of a processor, such as a neural network processor. The processor may have other integrated circuit components, including additional accelerator engines.

In various implementations, the memory subsystem 504 can include multiple memory banks 514. In these implementations, each memory bank 514 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 514. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 504 can permit simultaneous access to the read or write channels of multiple memory banks. As another example, the memory subsystem 504 can include arbitration logic such that arbitration between, for example, the outputs of multiple memory banks 514 can result in more than one memory bank's output being used. In these and other examples, though globally managed by the memory subsystem 504, each memory bank can be operated independently of any other.

Having the memory banks 514 be independently accessible can increase the efficiency of the accelerator 502. For example, values can be simultaneously read and provided to each row of the processing engine array 510, so that the entire processing engine array 510 can be in use in one clock cycle. As another example, the memory banks 514 can be read at the same time that results computed by the processing engine array 510 are written to the memory subsystem 504. In contrast, a single memory may be able to service only one read or write at a time. With a single memory, multiple clock cycles can be required, for example, to read input data for each row of the processing engine array 510 before the processing engine array 510 can be started.

In various implementations, the memory subsystem 504 can be configured to simultaneously service multiple clients, including the processing engine array 510, the activation engine 516, the pooling engine 518, and any external clients that access the memory subsystem 504 over a communication fabric 520. In some implementations, being able to service multiple clients can mean that the memory subsystem 504 has at least as many memory banks as there are clients. In some cases, each row of the processing engine array 510 can count as a separate client. In some cases, each column of the processing engine array 510 can output a result, such that each column can count as a separate write client. In some cases, output from the processing engine array 510 can be written into the memory banks 514 that can then subsequently provide input data for the processing engine array 510. As another example, the activation engine 516 and the pooling engine 518 can include multiple execution channels, each of which can be separate memory clients. The memory banks 514 can be implemented, for example, using static random access memory (SRAM).

In various implementations, the memory subsystem 504 can include control logic. The control logic can, for example, keep track of the address spaces of each of the memory banks 514, identify memory banks 514 to read from or write to, and/or move data between the memory banks 514. In some implementations, memory banks 514 can be hardwired to particular clients. For example, a set of memory banks 514 can be hardwired to provide values to the rows of the processing engine array 510, with one memory bank servicing each row. As another example, a set of memory banks can be hard wired to receive values from columns of the processing engine array 510, with one memory bank receiving data for each column.

The processing engine array 510 is the computation matrix of the example accelerator 502. The processing engine array 510 can, for example, execute parallel integration, convolution, correlation, and/or matrix multiplication, among other things. The processing engine array 510 includes multiple processing engines 511, arranged in rows and columns, such that results output by one processing engine 511 can be input directly into another processing engine 511. Processing engines 511 that are not on the outside edges of the processing engine array 510 thus can receive data to operate on from other processing engines 511, rather than from the memory subsystem 504.

In various examples, the processing engine array 510 uses systolic execution, in which data arrives at each processing engine 511 from different directions at regular intervals. In some examples, input data can flow into the processing engine array 510 from the left and weight values can be loaded at the top. In some examples weights and input data can flow from the left and partial sums can flow from top to bottom. In these and other examples, a multiply-and-accumulate operation moves through the processing engine array 510 as a diagonal wave front, with data moving to the right and down across the array. Control signals can be input at the left at the same time as weights, and can flow across and down along with the computation.

In various implementations, the number of columns in the processing engine array 510 determines the computational capacity of the processing engine array 510, and the number of rows determines the required memory bandwidth for achieving maximum utilization of the processing engine array 510. The processing engine array 510 can have, for example, 64 columns and 128 rows, or some other number of columns and rows.

An example of a processing engine 511 is illustrated in FIG. 5 in an inset diagram. As illustrated by this example, a processing engine 511 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 511.

In the illustrated example, an input from above can include a partial sum, p_in, provided either from another processing engine 511 or from a previous round of computation by the processing engine array 510. When starting a computation for a new set of input data, the top row of the processing engine array 510 can receive a fixed value for p_in, such as zero. As illustrated by this example, i and w are multiplied together and the result is summed with p_in to produce a new partial sum, p_out, which can be input into another processing engine 511. Various other implementations of the processing engine 511 are possible.

Outputs from the last row in the processing engine array 510 can be temporarily stored in the results buffer 512. The results can be intermediate results, which can be written to the memory banks 514 to be provided to the processing engine array 510 for additional computation. Alternatively, the results can be final results, which, once written to the memory banks 514 can be read from the memory subsystem 504 over the communication fabric 520, to be output by the system.

In some implementations, the accelerator 502 includes an activation engine 516. In these implementations, the activation engine 516 can combine the results from the processing engine array 510 into one or more output activations. For example, for a convolutional neural network, convolutions from multiple channels can be summed to produce an output activation for a single channel. In other examples, accumulating results from one or more columns in the processing engine array 510 may be needed to produce an output activation for a single node in the neural network. In some examples, activation engine 516 can be bypassed.

In various examples, the activation engine 516 can include multiple separate execution channels. In these examples, the execution channels can correspond to the columns of the processing engine array 510, and can perform an operation on the outputs of a column, the result of which can be stored in the memory subsystem 504. In these examples, the activation engine 516 may be able to perform between 1 and p parallel computations, where p is equal to the number of columns in the processing engine array 510. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 502 can include a pooling engine 518. Pooling is the combining of outputs of the columns of the processing engine array 510. Combining can include for example, computing a maximum value, a minimum value, an average value, a median value, a summation, a multiplication, or another logical or mathematical combination. In various examples, the pooling engine 518 can include multiple execution channels that can operate on values from corresponding columns of the processing engine array 510. In these examples, the pooling engine 518 may be able to perform between 1 and p parallel computations, where k is equal to the number of columns in the processing engine array 510. In various examples, execution channels of the pooling engine 518 can operate in parallel and/or simultaneously.

Herein, the activation engine 516 and the pooling engine 518 may be referred to collectively as execution engines. The processing engine array 510 is another example of an execution engine. Another example of an execution engine is a Direct Memory Access (DMA) engine, which may be located outside the accelerator 502.

Certain embodiments can be used to accelerate the copy operations performed by the pooling engine 518. Referring back to FIG. 1, the pooling engine 518 can be the computing engine 102 which can execute instructions to perform copy operations between the memory subsystem 504 and the results buffer 512. The memory subsystem 504 may be similar to the first memory 104 that is coupled to the pooling engine 518 via a bus 522, and the results buffer 512 may be similar to the second memory 106 that is coupled to the pooling engine 518 via a bus 524. In some embodiments, the memory banks 514 and/or the results buffer 512 can be an example of the P number of memory units described with reference to FIG. 2. For example, the bus 522 may support writing to or reading the P number of data elements simultaneously from the memory banks 514 per cycle, and the bus 524 may support writing to or reading the P number of data elements simultaneously from the results buffer 512 per cycle. Each of the buses 522 and 524 may be at least P×Q bytes wide similar to the bus 202, and can have different bus widths. Thus, performance of the accelerator 502 can be improved by accelerating the copy operations using the opportunistic approach described with reference to FIGS. 1-4.

Input data 550 can arrive over the communication fabric 520. The communication fabric 520 can connect the accelerator 502 to other components of a processor, such as a DMA engine that can obtain input data 550 from an Input/Output (I/O) device, a storage drive, or a network interface. The input data 550 can be, for example one-dimensional data, such as a character string or numerical sequence, or two-dimensional data, such as an array of pixel values for an image or frequency and amplitude values over time for an audio signal. In some examples, the input data 550 can be three-dimensional, as may be the case with, for example, the situational information used by a self-driving car or virtual reality data. In some implementations, the memory subsystem 504 can include a separate buffer for the input data 550. In some implementations, the input data 550 can be stored in the memory banks 514 when the accelerator 502 receives the input data 550.

In some examples, the accelerator 502 can implement a neural network processing engine. In these examples, the accelerator 502, for a set of input data 550, can execute a neural network to perform a task for which the neural network was trained. Executing a neural network on a set of input data can be referred to as inference or performing inference.

The weights for the neural network can be stored in the memory subsystem 504, along with input data 550 on which the neural network will operate. The neural network can also include instructions, which can program the processing engine array 510 to perform various computations on the weights and the input data. The instructions can also be stored in the memory subsystem 504, in the memory banks 514 or in a separate instruction buffer. The processing engine array 510 can output intermediate results, which represent the outputs of individual layers of the neural network. In some cases, the activation engine 516 and/or pooling engine 518 may be enabled for computations called for by certain layers of the neural network. The accelerator 502 can store the intermediate results in the memory subsystem 504 for inputting into the processing engine array 510 to compute results for the next layer of the neural network. The processing engine array 510 can further output final results from a last layer of the neural network. The final results can be stored in the memory subsystem 504 and then be copied out to host processor memory or to another location. The P number of data elements can be part of the input data 550, or the intermediate results or the final results generated by the processing engine array 510.

Figure 6:
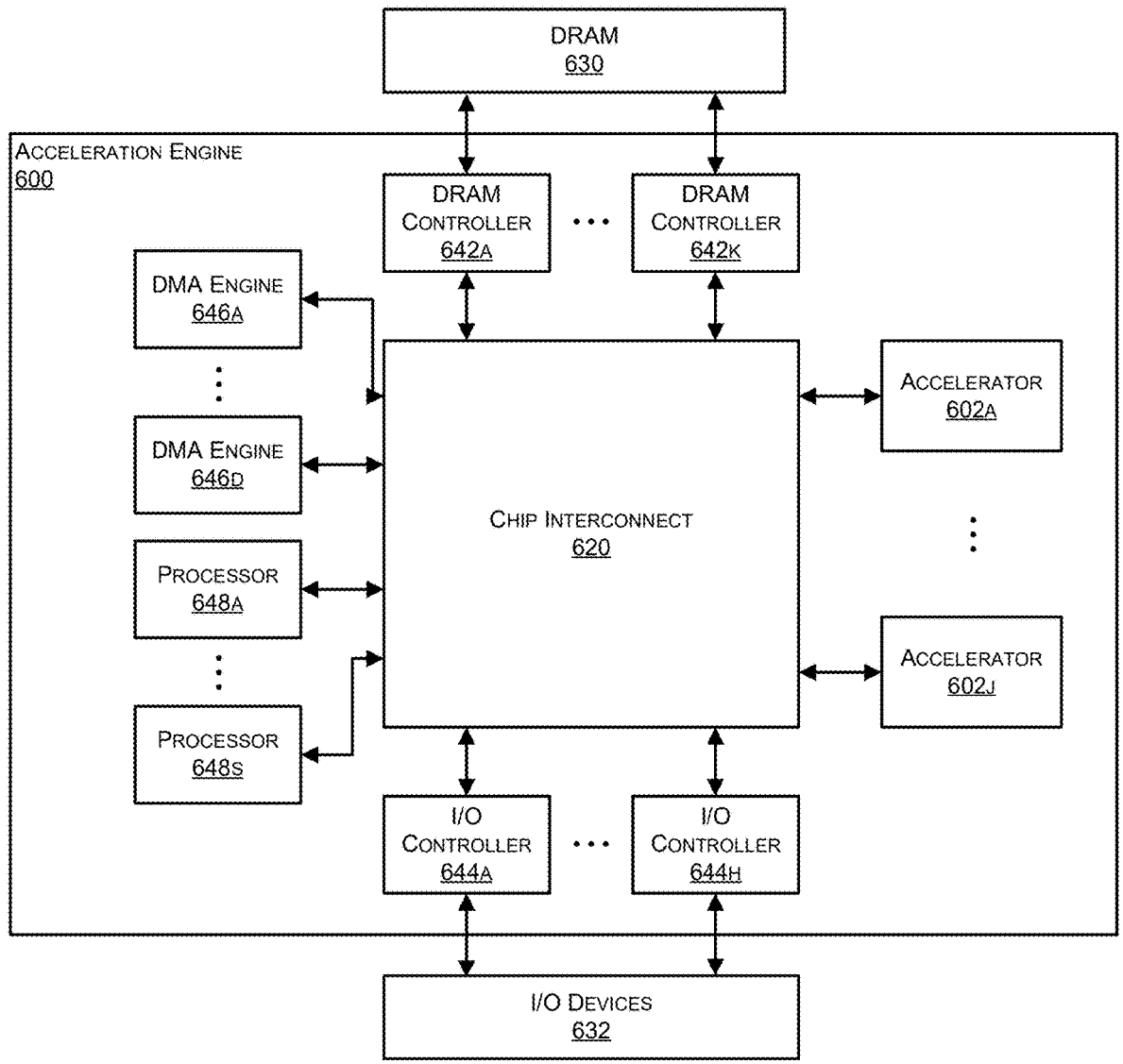
FIG. 6 includes a block diagram that illustrates an example of an acceleration engine.

FIG. 6 includes a block diagram that illustrates an example of an acceleration engine 600. The acceleration engine 600 is an example of an integrated circuit that can include one or more accelerators 602a-602j that may be similar to the accelerator 502 illustrated in FIG. 5.

In the example of FIG. 6, the acceleration engine 600 includes multiple accelerators 602a-602j, each of which can perform a set of operations. In various examples, the accelerators 602a-602j are for particular types of operations, so that the accelerators 602a-602j can perform the operations much faster than when similar operations are performed by a general purpose processor. In various examples, to perform a set of operations, input data on which the operations are to be performed must first be moved into the accelerators 602a-602j. Additionally, in some cases, program code is also moved into the accelerators 602a-602j, which programs the operations that the accelerators 602a-602j will perform on the data. In the illustrated example, the acceleration engine 600 includes n accelerators 602a-602j. Examples of accelerators that can be included in the acceleration engine 600 include graphics accelerators, floating point accelerators, neural network accelerators, and others. In various examples, the accelerators 602a-602j can each be the same (e.g., each of the accelerators 602a-602j is a graphics accelerator) or can be different (e.g., the accelerators 602a-602j include a graphics accelerator, a floating point accelerator, and neural network accelerator).

The example acceleration engine 600 further includes DRAM controllers 642a-642k for communicating with an external memory. The external memory is implemented, in this example, using DRAM 630. In the illustrated example, the acceleration engine 600 includes k DRAM controllers 642a-642k, each of which may be able to communicate with an independent set of banks of DRAM. In other examples, other types of RAM technology can be used for the external memory. The DRAM controllers 642a-642k can also be referred to as memory controllers.

In various examples, input data and/or program code for the accelerators 602a-602j can be stored in the DRAM 630. Different programs can cause the accelerators 602a-602j to perform different operations. For example, when one of the accelerators is a neural network accelerator, one program can configure the neural network accelerator to perform speech recognition while another program can configure the neural network accelerator to perform image recognition. In various examples, different accelerators 602a-602j can be programmed with different programs, so that each performs a different set of operations. In various examples, the processors 648a-648s can manage moving of program code from the DRAM 630 to the accelerators 602a-602j.

The example acceleration engine 600 further includes I/O controllers 644a-644h for communicating with I/O devices 632 in the system. The acceleration engine 600 can communicate with I/O devices over, for example, a processor bus. In some examples, the processor bus can be implemented using Peripheral Component Interconnect (PCI) and/or a variation of the PCI bus protocol. The processor bus can connect the acceleration engine 600 to I/O devices such as, for example, input and output devices, memory controllers, storage devices, and/or network interface cards, among other things. In some examples, the I/O controllers 644-644p can enable the acceleration engine 600 to act as an I/O device for a host processor. For example, the acceleration engine 600 can be the recipient of input data from the host processor, and a command indicating an operation to be performed on the input data (e.g., a particular computation or analysis). In the illustrated example, the acceleration engine 600 includes p I/O controllers 644a-644h, each of which may include a separate root complex and may communicate with a separate set of I/O devices 632. In other examples, other standardized bus protocols, such as Ultra Path Interconnect (UPI) can be used for the host bus. In other examples, a proprietary bus protocol can be used.

Movement of data in the acceleration engine 600 can be managed by one or more processors 648a-648s, which can also be referred to as data management processors. In the example of FIG. 6, the acceleration engine 600 includes s processors 648a-648s incorporated into the device (e.g., on the same silicon die). In other examples, the processors 648a-648s can be external to the acceleration engine 600 (e.g., on a different die and/or in a different package). In some examples, the processors 648a-648s can manage the movement of data from I/O devices 632 to the accelerators 602a-602j or the DRAM 630. For example, input data may be located at an I/O device 632 or in processor memory, and the processors 648a-648s can move the input from the I/O device 632 or processor memory into an accelerator or into DRAM 630. As another example, program code for the accelerators 602a-602j may be located on an I/O device 632 or in processor memory.

The example acceleration engine 600 further includes DMA engines 646a-646d that can move data between the accelerators 602a-602j, DRAM controllers 642a-642k, and I/O controllers 644a-644h. In the illustrated example, the acceleration engine 600 includes d DMA engines 646a-646d. In some implementations, the DMA engines 646a-646d can be assigned to specific tasks, such as moving data from the DRAM controllers 642a-642d to the accelerators 602a-602j, or moving data between the I/O controllers 644a-644h and the accelerators 602a-602j. These tasks can be assigned, for example, by enqueueing descriptors with the DMA engines 646a-646d, where a descriptor identifies an address for a block of data and an operation (e.g., a read or a write) to perform. A descriptor, for example, can direct a DMA engine to instruct a DMA controller to read a block of data from DRAM 630. A descriptor can, as a further example, instruct the DMA engine to write data, read by the DMA controller, to an accelerator. Further descriptors can be used to move data from an accelerator to DRAM 630.

In various examples, each of the processors 648a-648s can be responsible for managing the data movement for a different accelerator. In some examples, a processor may manage the data movement for more than one accelerator. Similarly, in various examples, each of the processors 648a-648s can be assigned to one or more DMA engines 646a-646d. In these and other examples, associations between processors 648a-648s, accelerators 602a-602j, and DMA engines 646a-646d are determined by program code being executed by each respective processor.

In the example acceleration engine 600, the various components can communicate over a chip interconnect 620. The chip interconnect 620 primarily includes wiring for routing data between the components of the acceleration engine 600. In some cases, the chip interconnect 620 can include a minimal amount of logic, such as multiplexors to control the direction of data, flip-flops for handling clock domain crossings, and timing logic.

Figure 7:
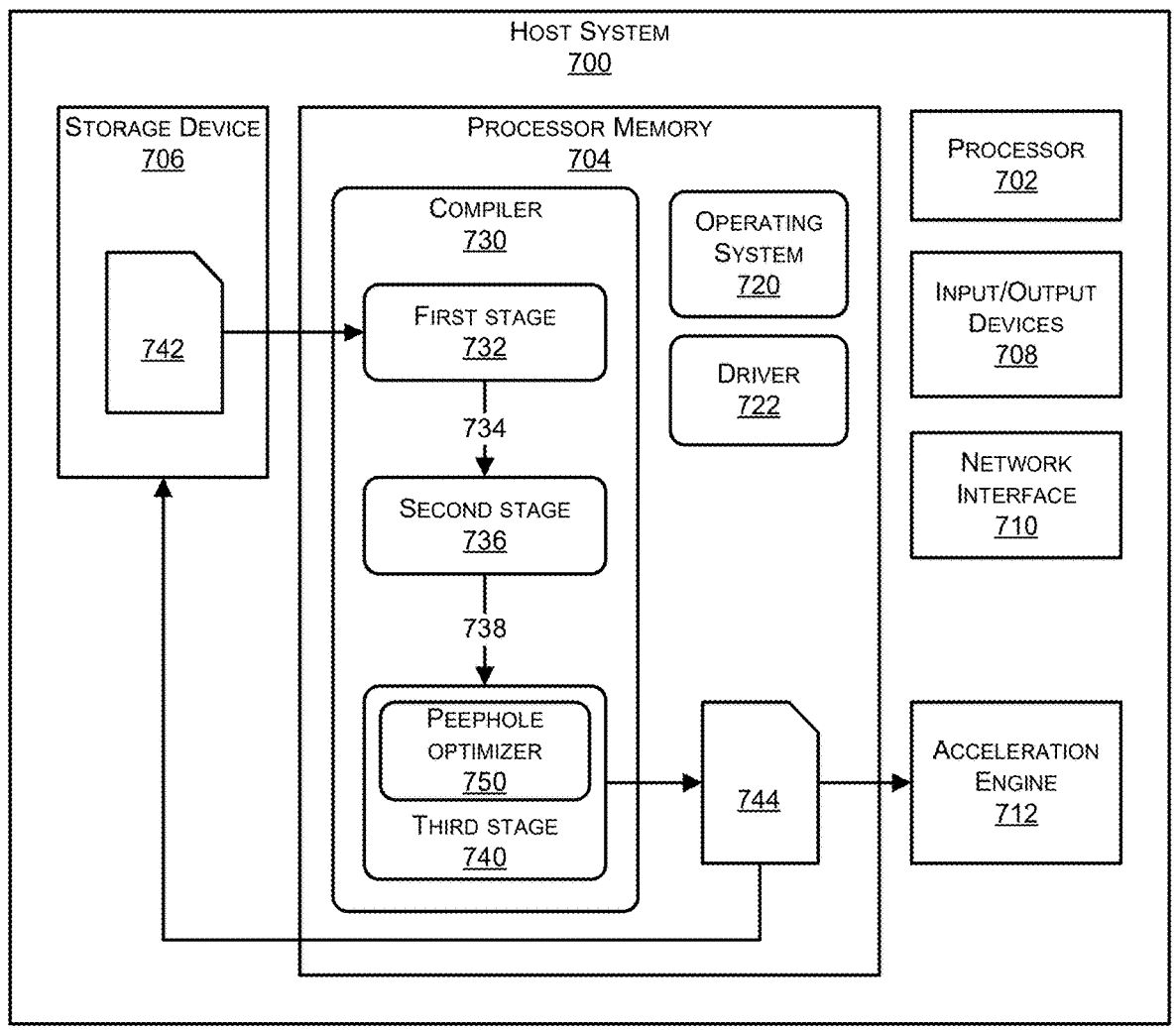
FIG. 7 includes a block diagram illustrating an example of a host system.

FIG. 7 includes a block diagram illustrating an example of a host system 700 on which a compiler 730, such as is described herein, can run. The illustrated host system 700 is an example of a computing device, and includes a processor 702, a processor memory 704, at least one storage device 706, various Input/Output (I/O) devices 708, and at least one network interface 710. In the example of FIG. 7, the host system 700 also includes an acceleration engine 712, which is an integrated circuit device that can accelerate certain operations or computations performed by the host system 700. In various examples, the host system 700 can be implemented as a server in a data center, a desktop computer, a laptop computer, a tablet computer, or a smartphone, among other examples. In some examples, operations or components discussed below as being performed or included in the host system 700 can be performed or included in other computer devices. For example, the compiler 730 can execute on the host system 700 while the acceleration engine 712 is located at a different host system.

The processor 702 is an integrated circuit device that can execute program code, in the form of instructions. The program code can be for various software applications or tools, such as an operating system 720 or the illustrated compiler 730. While the processor 702 is executing a program, the instructions for the program can be stored in the processor memory 704. The instructions can also be stored elsewhere, such as on the storage device 706, and can be loaded into the processor memory 704 when needed by the processor 702. The processor 702 can also use the processor memory 704 for temporary storage of other data on which the processor 702 is operating. In various examples, the processor memory 704 is a volatile memory type, such as a type of Random Access Memory, though non-volatile memory types can, alternatively or additionally, be used for the processor memory 704.

The storage device 706 is an example of a device that can include non-volatile memory. For example, the storage device 706 can be a magnetic disk drive, a solid state drive, or an optical drive, among other examples. The storage device 706 can further be non-transitory, such that program code and other data stored on the storage device 706 remains present when the storage device 706 is not powered on.

The storage device 706 is one example of a peripheral device, which are components that can be coupled to the host system 700 to add functionality to the host system 700. Other examples of peripheral devices include the Input/Output devices 708 and the network interface 710. The Input/Output devices 108 can include user input and output devices, such as keyboards, mice, touch screens, microphones, display screens, speakers, printers, and scanners, among other examples. The network interface 710, which can be implemented using a network interface card, can provide access to one or more networks. The network interface 710 can include, for example, a physical port for connecting a network cable and/or wireless antennas for communicating with Wi-Fi and/or cellular networks. The network interface 710 can also be described as an I/O device.

The acceleration engine 712 is also another type of peripheral device or I/O device. The acceleration engine 712 is a device that is purpose-built to perform certain operations that can be performed by the processor 702, but can be performed faster by the acceleration engine 712. For example, the acceleration engine 712 can be a neural network accelerator, and, as such, may be able to perform the large scale, parallel computations of a neural network more efficiently than when the computations are performed by the processor 702. As another example, the acceleration engine 712 can be a graphics processing unit (GPU), and may be optimized to perform the computations needed for graphics rendering. Other examples of devices that can be implemented by the acceleration engine 712 include cryptographic accelerators, compression and decompression accelerators, 3-D accelerators, regular expression accelerators, security accelerators, and others. In some examples, the acceleration engine 712 can be the acceleration engine 600 in FIG. 6.

In various examples, the acceleration engine 712 can execute program code to perform certain operations. For example, when the acceleration engine 712 is a neural network accelerator, the acceleration engine 712 can be programmed to execute a particular neural network, such as one that performs image recognition or one that performs machine translation. As a further example, to support the execution of a neural network, the acceleration engine 712 can be programed to perform operations such as copying data for the neural network from processor memory 104 (for example) into the acceleration engine 712, copying input data for the neural network from processor memory 104 into the acceleration engine 712, and/or copying results from the acceleration engine 712 into the processor memory 104, among other examples.

To generate program code for the acceleration engine 712, in various examples, the host system 700 can execute the compiler 730. Compilers, in general, are software programs that translate program code written in a human-readable language into a format (e.g., machine instructions) that can be read and processed by an integrated circuit device. In the example of FIG. 7, the acceleration engine 712 is a neural network accelerator and the compiler 730 is for compiling a neural network description into instructions to be executed by the acceleration engine 712. When the acceleration engine 712 implements a different type of accelerator, another compiler can be used.

The compiler 730 can be activated, for example, when the operating system 720 receives keyboard, mouse, touchscreen, voice commands, or other inputs from the Input/Output devices 108. The inputs can further include parameters for the compiler 730, such as the input code 742 to compile and configuration options for the compilation process. Once the compiler 730 is activated, the processor 702 can load the instructions for the compiler 730 into the processor memory 104, and can execute the instructions.

In the example of FIG. 7, the compiler 730 includes a first stage 732, a second stage 736, and a third stage 740, which each perform different operations to produce compiled code 744. In other examples, the compiler 730 can combine the operations of the first stage 732, second stage 736, and/or third stage 740 into fewer stages, or can divide the operations of one of the stages into multiple stages.

The first stage 732 can receive and process input code 742. The input code 742 can describe a program in a high-level programming language, such as Java, C++, or Tensorflow, among many other examples. In some examples, the input code 742 may correspond to a neural network compute graph. The input code 742 can describe, for example, steps to perform image recognition, speech recognition, machine translation, or other operations. The input code 742 can be obtained, for example, from the storage device 706. Alternatively, though not illustrated here, the input code 742 may be located in the processor memory 704 or can be obtained from a network location, using the network interface 710. Processing of the input code 742 can include sorting the operations described in the input code 742 into layers, where the outputs of one layer provide the inputs to a next layer. Processing can also include identifying steps to be performed by the processor 702, rather than by the acceleration engine 712. For example, the processor 702, through the execution of a driver 722, may need to perform steps such as configuring Direct Memory Access (DMA) descriptors for moving data into or out of the acceleration engine 712, among other examples.

The output 734 of the first stage 732 can be organized, for example, in the layers, nodes, and connections between nodes of a neural network. The second stage 736 can perform intermediate processing on this output 734. For example, the operations performed in any one layer, or at any one node in a layer, may be too many for the acceleration engine 712 to perform at the same time. The acceleration engine 712 may, for example, have a limited amount of locale storage space for the data needed for a computation, or the computations may be more than the acceleration engine 712 can perform at one time. In this example, the first stage 732 can break the operations of the layer or node down into smaller operations, which can fit into the acceleration engine's local memory and/or can fit into the computing capacity of the acceleration engine 712. Processing of the output 734 of the first stage 732 can include other steps, such as scheduling, or determining the order in which the acceleration engine 712 and/or processor 702 will perform operations, among other examples.

In various examples, the output 738 of the second stage 736 may include the various steps to be performed by components of the acceleration engine 712, in the order that the steps are to be performed. The output 738 can be represented, for example, as a data flow graph, where the nodes in the graph represent memory operations, computations, and other operations, and the edges or connections between the nodes represent dependencies between the nodes, such as data dependencies, memory dependencies, or operational dependencies, among other examples.

The third stage 740 can operate on the output 738 of the second stage 736, and perform various steps before producing the instructions that are to be executed by the acceleration engine 712. These steps can include, for example, removing redundant dependencies, resolving or handling dependencies between nodes by inserting synchronization instructions into the code, identifying possibly optimizations in memory usage or memory bandwidth usage, and other operations.

In some embodiments, the third stage 740 may include a peephole optimizer 750 that can accelerate certain memory copy operations based on an opportunistic approach. For example, the peephole optimizer 750 may "peep" into or analyze the IR instructions stream from the second stage 736 for an opportunity to optimize certain memory copy instructions. As discussed with reference to FIGS. 1-4, memory copy operations can be accelerated by replacing an IR copy instruction having a smaller data type with another IR copy instruction having a higher data type based on the alignment of the source and destination memory addresses, and the total number of data elements to be copied for each of the P number of memory units. The peephole optimizer 750 may be configured to access the IR instructions generated in the second stage 736 to identify the IR instructions for the memory copy operations that can be accelerated. An example IR instruction for a copy operation between a first memory and a second memory may include a source address associated with the first memory, a destination address associated with the second memory, a first data type identifier indicating a first data type that has M number of bytes per data element, and a first total number of data elements in the first data type to be copied for each of the P number of memory units.

The peephole optimizer 750 may be configured to identify a first IR instruction for a memory copy operation to be performed by a computing engine to copy P number of data elements per cycle from the first memory to the second memory. The peephole optimizer 750 may be further configured to determine that the M number of bytes of the first data type is smaller than a maximum number of bytes per cycle that the computing engine supports for copying each of the P number of data elements. The peephole optimizer 750 may be further configured to determine that the source address and the destination address are aligned to an address boundary associated with a second data type. The second data type can have N number of bytes per data element, where N is a multiple of M. The peephole optimizer 750 may be further configured to replace the first IR instruction with a second IR instruction to accelerate the memory copy operation to copy the P number of data elements per cycle from the first memory to the second memory. The second IR instruction may comprise a second data type identifier indicating the second data type, and a second total number of data elements in the second data type to be copied for each of the P number of memory units. The second total number of data elements can be calculated based on a ratio of M to N, and the first total number of data elements.

In some examples, an IR instruction for a tensor copy operation may include a memory pattern in place of the source address. The memory pattern may include a start address, a stride for a plurality of dimensions (e.g., x, y, z, and w), and the number of elements in the plurality of dimensions. Note that for simplicity reasons, copy operations for a single dimension have been discussed in this specification; however, it will be understood that the peephole optimization techniques described herein may be equally applicable to all the other dimensions within the scope of the disclosure.

After replacing the identified IR instructions for the copy operations, the machine level instructions can be generated. In some examples, the third stage 740 may include a data scheduler to determine the order in which instructions are executed by the acceleration engine 712. The output of the third stage 740 is compiled code 744, which may include machine instructions in binary format. The compiled code 744 may also include a machine level instruction corresponding to the second IR instruction having the second data type for the copy operation. In some examples, the compiled code 744 can be stored in the processor memory 104. Alternatively or additionally, the compiled code 744 can be copied to the storage device 706 or to a network location. As noted above, the acceleration engine 712 may be located at a different host system, in which case the compiled code 744 can be sent over the network interface 710 to the other host system.

In the example of FIG. 7, the host system 700 can be executing a driver 722, which can also be referred to as a device driver or runtime driver, that manages the acceleration engine 712. The driver 722 can provide an interface between applications executing on the host system 100 (or on another host system) and the acceleration engine 712. For example, the driver 722 can provide an Application Program Interface (API) that defines functions for feeding input data to the acceleration engine 712 and defining the operation to perform on the input data. In this and other examples, the driver 722 can configure the acceleration engine 712 to perform the operation. For example, the driver 722 can identify a neural network that the acceleration engine 712 is to execute, as well as the location in the processor memory 704 or on the storage device 106 where the compiled code 744 for the neural network is located. The driver 722 can further load into the acceleration engine 712 or cause the acceleration engine 712 to load the compiled code 744, can load or cause the acceleration engine 712 to load the input data on which the neural network is to operate, and/or can cause the acceleration engine 712 to being executing on the input data. Once the acceleration engine 712 has finished, the acceleration engine 712 can notify the driver 722, and the driver 722 can deliver a result back to the application that requested the result.

Figure 8:
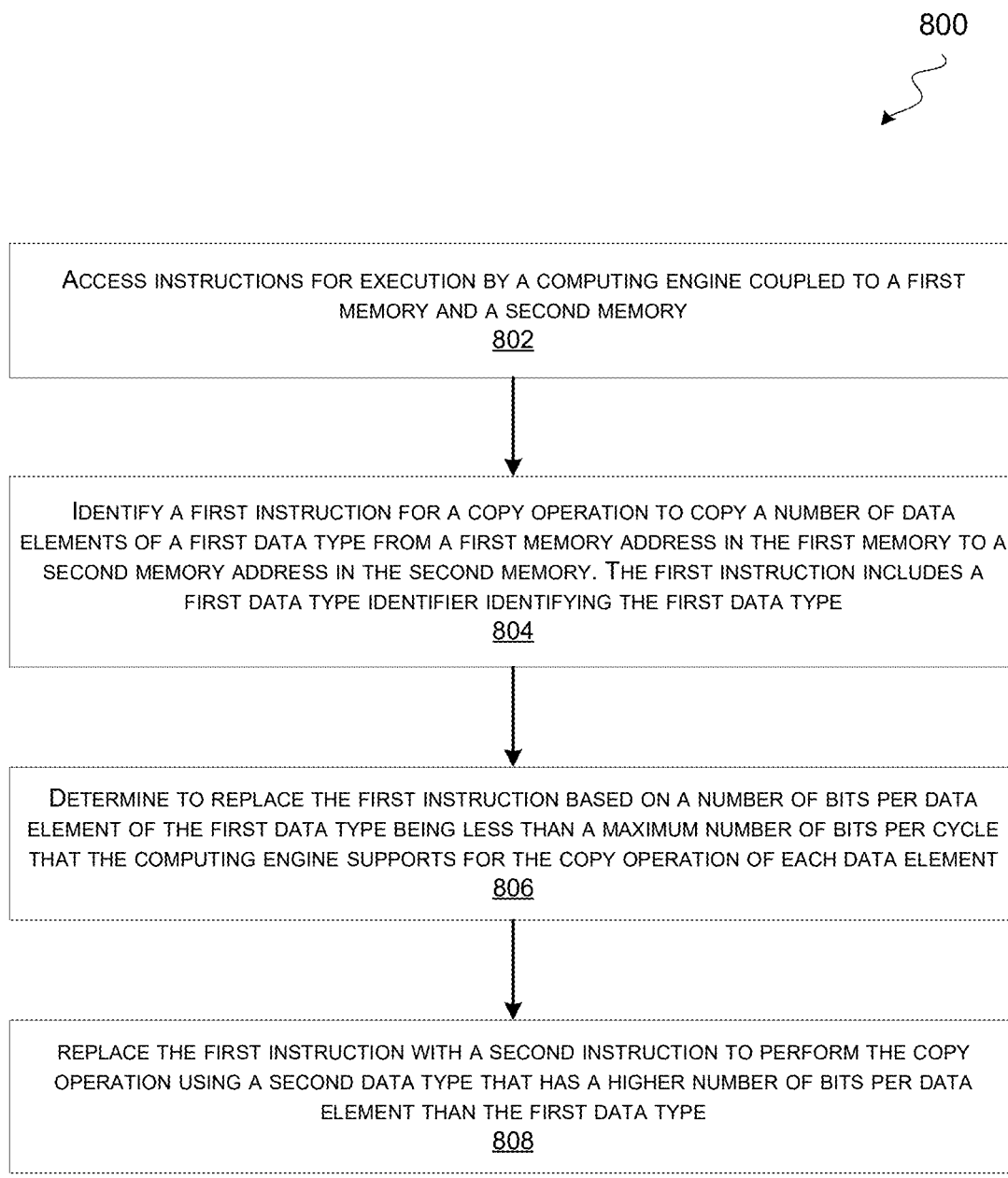
FIG. 8 illustrates a computer-implemented method that can be used to accelerate certain memory copy operations according to various embodiments.

FIG. 8 illustrates a computer-implemented method 800 that can be used to accelerate certain memory copy operations according to various embodiments. The method 800 can be executed by a compiler such as the compiler 730. As discussed with reference to FIG. 7, the processor 702 may execute the compiler 730 by executing instructions that are part of the input code 742. The compiler 730 may be configured to accelerate certain memory copy operations based on an opportunistic approach, which can ultimately improve the performance of the acceleration engine 712.

In step 802, the compiler may access instructions for execution by a computing engine coupled to a first memory and a second memory. The computing engine may be the computing engine 102 coupled to the first memory 104 and the second memory 106. In certain embodiments, the computing engine 102 may be the pooling engine 518 and the copy operation may include copying a number of data elements from the memory subsystem 504 to the results buffer 512. As discussed with reference to FIG. 7, the instructions can include the IR instructions that may be part of the output 738 of the second stage 736 and can be accessed by the peephole optimizer 750. In some examples, the peephole optimizer 750 can accelerate certain memory copy operations performed by the pooling engine 518 to copy data between the memory subsystem 504 and the results buffer 512 based on an opportunistic approach.

In step 804, the compiler may identify a first instruction for a copy operation to copy a number of data elements of a first data type from a first memory address in the first memory to a second memory address in the second memory, where the first instruction includes a first data type identifier identifying the first data type. The first instruction may further include the first memory address, the second memory address, and the number of data elements of the first data type to copy. As an example, the peephole optimizer 750 may identify a first IR instruction for a copy operation to copy 4 data elements of the FP16 data type from the address 0x100 in the pooling engine 518 to an address 0x140 in the results buffer 512.

In step 806, the compiler may determine to replace the first instruction based on a number of bits per data element of the first data type being less than a maximum number of bits per cycle that the computing engine supports for the copy operation of each data element. The peephole optimizer 750 may determine that the first IR instruction has to be replaced based on the 16-bits per data element of the FP16 data type being less than the 32 bits per cycle supported by the computing engine 102 for the copy operation. For example, the buses 522 and 524, and the pooling engine 518 may support maximum 32-bits per cycle for the copy operation of each data element, which is more than the 16-bits per data element of the FP16 data type. Thus, as shown by the timing diagram 304 in FIG. 4, half of the buses 522 and 524 may not be utilized in the T1, T2, T3, and T4 cycles.

In step 808, the compiler may replace the first instruction with a second instruction to perform the copy operation using a second data type that has a higher number of bits per data element than the first data type. The compiler may further determine to replace the first instruction with the second instruction based on determining that the number of data elements of the first data type to copy is an even number and that the first memory address and the second memory address are aligned to an address boundary associated with the higher number of bits per data element for the second data type. After replacing the first instruction with the second instruction, the compiler may further generate machine level instructions to be executed by the computing engine to perform the copy operation based on the second instruction.

The computing engine may perform the copy operation in parallel for the P number of data elements per cycle with each data element of the P number of data elements being of the second data type. The peephole optimizer 750 may replace the first IR instruction with a second IR instruction to perform the copy operation using the FP32 data type that has a higher number of bits per data element than the FP16 data type. The peephole optimizer 750 may determine to replace the second IR instruction based on the 0x100 and the 0x140 being aligned to a 4-byte address boundary associated with the FP32 data type and 4 being an even number. As shown in the timing diagram 402 in FIG. 4, the FP32 data type can be used in place of two FP16 data elements to fully utilize the 32-bit buses. Furthermore, the second IR instruction can be performed in 2 cycles as compared to 4 cycles used by the first IR instruction.

As discussed with reference to FIGS. 1-8, various embodiments can provide an opportunistic approach to accelerate certain memory copy operations to be performed by a computing engine by executing instructions. A compiler can identify a first copy instruction that has a first data type with a smaller number of bits per data element than supported by the underlying hardware of the computing engine for copying one data element per cycle. The compiler can replace the first copy instruction with a second copy instruction that has a second data type with a higher number of bits per data element. The second data type may be determined based on the alignment of the source and destination memory addresses, and the total number of data elements to be copied. Copying the higher number of bits per data element can accelerate the memory copy operations since it may take fewer cycles to perform the copy operation. Furthermore, use of the second data type can provide better utilization of the underlying hardware without changing the hardware because of the higher number of bits per data element being used for the copy operation each cycle.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-implemented method comprising:
   accessing instructions for execution by a computing engine coupled to a first memory and a second memory;
   identifying a first instruction for a copy operation to copy a number of data elements of a first data type from a first memory address in the first memory to a second memory address in the second memory, the first instruction including a first data type identifier identifying the first data type;
   determining to replace the first instruction based on a number of bits per data element of the first data type being less than a maximum number of bits per cycle that the computing engine supports for the copy operation of each data element; and
   replacing the first instruction with a second instruction to perform the copy operation using a second data type that has a higher number of bits per data element than the first data type.

2. The computer-implemented method of claim 1, wherein determining to replace the first instruction includes:
   determining that the number of data elements of the first data type to copy is an even number; and
   determining that the first memory address and the second memory address are aligned to an address boundary associated with the higher number of bits per data element for the second data type.

3. The computer-implemented method of claim 1, wherein the first instruction further includes the first memory address, the second memory address, and the number of data elements of the first data type to copy.

4. The computer-implemented method of claim 1, wherein the second instruction further comprises a number of data elements of the second data type to copy, the number of data elements of the second data type being smaller than the number of data elements of the first data type.

5. The computer-implemented method of claim 1, wherein the computing engine performs the copy operation by copying, in parallel, P number of data elements per cycle from respective P number of memory units in the first memory to the second memory with each of the P number of data elements being of the second data type.

6. The computer-implemented method of claim 5, wherein the computing engine is coupled to the first memory via a first bus and to the second memory via a second bus, and wherein the first bus and the second bus have different bus widths.

7. The computer-implemented method of claim 1, wherein the first data type or the second data type is one of a signed integer (INT) data type, an unsigned integer (UINT) data type, a floating point (FP) data type, or a brain floating point (BFloat) data type.

8. The computer-implemented method of claim 7, wherein the first data type has either 8 bits or 16 bits per data element, the second data type has 32 bits per data element, and the first memory address and the second memory address are aligned to a 4-byte address boundary.

9. The computer-implemented method of claim 7, wherein the first data type has 8 bits per data element, the second data type has 16 bits per data element, and the first memory address and the second memory address are aligned to a 2-byte address boundary.

10. The computer-implemented method of claim 7, wherein the second data type is of a different data type than the first data type.

11. The computer-implemented method of claim 1, wherein the higher number of bits per data element of the second data type is an integer multiple of the number of bits per data element of the first data type.

12. The computer-implemented method of claim 1, wherein the first instruction and the second instruction are intermediate representation (IR) instructions that are generated based on a neural network model.

13. A non-transitory computer readable medium having stored therein program code that, when executed by one or more processors, causes the one or more processors to execute a compiler, the compiler performing operations including:
  accessing instructions for execution by a computing engine coupled to a first memory and a second memory;
  identifying a first instruction for a copy operation to copy a number of data elements of a first data type from a first memory address in the first memory to a second memory address in the second memory, the first instruction including a first data type identifier identifying the first data type;
  determining to replace the first instruction based on a number of bits per data element of the first data type being less than a maximum number of bits per cycle that the computing engine supports for the copy operation of each data element; and
  replacing the first instruction with a second instruction to perform the copy operation using a second data type that has a higher number of bits per data element than the first data type.

14. The non-transitory computer readable medium of claim 13, wherein determining to replace the first instruction includes:
  determining that the number of data elements of the first data type to copy is an even number; and
  determining that the first memory address and the second memory address are aligned to an address boundary associated with the higher number of bits per data element for the second data type.

15. The non-transitory computer readable medium of claim 13, wherein the operations further include, prior to accessing the instructions for execution by the computing engine:
  generating the instructions based on a neural network model, wherein the instructions are intermediate representation (IR) instructions.

16. The non-transitory computer readable medium of claim 13, wherein the computing engine is part of a neural network processor, and wherein the operations further include:
  after replacing the first instruction with the second instruction, generating machine level instructions to be executed by the computing engine to perform the copy operation based on the second instruction.

17. The non-transitory computer readable medium of claim 13, wherein the copy operation includes copying the number of data elements from respective memory partitions of the first memory in parallel into the second memory.

18. The computer-implemented method of claim 1, wherein the first instruction is an instruction to copy a tensor.

19. The computer-implemented method of claim 18, wherein the first instruction includes a stride for one or more dimensions.

20. The computer-implemented method of claim 1, wherein the second instruction is performed using fewer cycles than the first instruction.

* * * * *